(12) United States Patent
Chasman et al.

(10) Patent No.: US 7,076,567 B1
(45) Date of Patent: Jul. 11, 2006

(54) SIMPLIFIED APPLICATION OBJECT DATA SYNCHRONIZATION FOR OPTIMIZED DATA STORAGE

(75) Inventors: Doug Chasman, Sorona, CA (US); Joel Heinke, Livermore, CA (US); Jeff Parrett, Pleasanton, CA (US); Bruce Shay, Livermore, CA (US)

(73) Assignee: Oracle International Corporation, Redwood Shores, CA (US)

( * ) Notice: Subject to any disclaimer, the term of this patent is extended or adjusted under 35 U.S.C. 154(b) by 527 days.

(21) Appl. No.: 10/133,124

(22) Filed: Apr. 25, 2002

(51) Int. Cl.
*G06F 15/16* (2006.01)

(52) U.S. Cl. ...................................... 709/248; 709/203

(58) Field of Classification Search ................ 709/248, 709/203, 217–219
See application file for complete search history.

(56) References Cited

U.S. PATENT DOCUMENTS

| | | | |
|---|---|---|---|
| 5,499,371 A | 3/1996 | Henninger et al. | |
| 5,694,598 A | 12/1997 | Durand et al. | |
| 5,710,922 A | 1/1998 | Alley et al. | |
| 5,729,735 A | 3/1998 | Meyering | |
| 5,758,337 A | 5/1998 | Hammond | |
| 5,937,409 A | 8/1999 | Wetherbee | |
| 6,240,422 B1 | 5/2001 | Atkins et al. | |
| 6,317,754 B1 | 11/2001 | Peng | |
| 6,324,544 B1 | 11/2001 | Alam et al. | |
| 6,539,381 B1 | 3/2003 | Prasad et al. | |
| 6,633,924 B1 | 10/2003 | Wu et al. | |
| 6,636,897 B1 * | 10/2003 | Sherman et al. | 709/248 |
| 6,674,445 B1 * | 1/2004 | Chithambaram et al. | 345/619 |
| 6,823,373 B1 * | 11/2004 | Pancha et al. | 709/219 |
| 6,862,617 B1 | 3/2005 | Wu | |
| 2001/0038624 A1 * | 11/2001 | Greenberg et al. | 370/352 |
| 2002/0033843 A1 | 3/2002 | Loos et al. | |
| 2002/0057803 A1 | 5/2002 | Loos et al. | |
| 2003/0004983 A1 | 1/2003 | Cohen | |
| 2003/0159136 A1 * | 8/2003 | Huang et al. | 717/171 |

OTHER PUBLICATIONS

U.S. Appl. No. 10/183,144, filed Jun. 25, 2002, Doug Chasman.
U.S. Appl. No. 10/133.164, filed Apr. 25, 2002, Doug Chasman.
U.S. Appl. No. 10/133,164, Chasman.
U.S. Appl. No. 10/183,144, Heinke.
U.S. Appl. No. 10/266,824, Caulfield.

* cited by examiner

*Primary Examiner*—David Wiley
*Assistant Examiner*—Phuoc H. Nguyen
(74) *Attorney, Agent, or Firm*—Townsend and Townsend and Crew LLP

(57) ABSTRACT

A method for synchronizing a mobile device with a central computer system is provided. The method includes coupling the mobile device to an application server of the central computer system over a network, defining a sync list that includes a candidate object type for distribution, synchronizing a relevant object of the candidate object type to the mobile device, determining a referenced object type from the relevant object type, and synchronizing a referenced object of the referenced object type to the mobile device. The sync list can be defined from meta-data that associates a user of the mobile device with one or more candidate object types, where the candidate object types serve as a starting point for the distribution process. Referenced object types can be determined from the relevant object types through additional meta-data.

29 Claims, 14 Drawing Sheets

SIMPLIFIED APPLICATION OBJECT DATA SYNCHRONIZATION FOR OPTIMIZED DATA STORAGE

CROSS-REFERENCE TO RELATED APPLICATION

This application is related to U.S. patent application Ser. No. 10/133,164, entitled "System and Method for Synchronization of Version Annotated Objects," filed on Apr. 23, 2002. The subject matter of the related application is hereby incorporated by reference.

BACKGROUND OF THE INVENTION

1. Field of the Invention

The present invention relates generally to the field of data distribution and storage, and more particularly to a method for synchronizing data on a mobile device with data stored in a centralized location.

2. Description of the Prior Art

In networked computer systems data is commonly stored in a central location such as a collection of disk drives. In networked computer systems such as those commonly found in business offices, a network server includes a primary data storage system for the network, and the networked computers access files and other data from the network server to cache locally. Increasingly, mobile devices such as laptop computers, handheld computers, and Personal Digital Assistants (PDAs) are being linked to networked computer systems.

FIG. 1 illustrates a simplified networked computer system 10 including a central database 12 and three connected devices, a Personal Digital Assistant (PDA) 14, a laptop computer 16, and a desktop computer 18. The devices are connected to the network by connections 20 that may take several forms. A connection 20 can be permanent, as in the case of the desktop computer 18 or the laptop computer 16 when it is attached to a docking station. A connection 20 can also be temporary, as in the laptop computer 16 when connected to the central database 12 over a dial-up Internet connection, or the PDA 14 when using an infra-red signal to communicate with a networked computer. A connection 20 may also be made between any of these devices and the central database 12 by way of a wireless modem. In FIG. 1 the PDA 14 and the laptop computer 16 are operated by User A while the desktop computer 18 is operated by User B. It will be understood from FIG. 1 that any number of permanent and mobile devices can be networked to the networked computer system 10 and that each user can be identified with more than one device.

In order to take full advantage of the networked computer system 10, its applications, and its extensive storage capacity, a mobile device will necessarily include a data storage system that should be regularly synchronized with the central database 12 to keep the data on the mobile device current. Ideally, the synchronization process should be able to provided the mobile device with a subset of the data residing in the central database 12, where the subset is no larger than necessary to meet the needs of the device. Keeping the subset small is desirable because a mobile device typically has a storage capacity several orders of magnitude less than that of a central database 12, and will operate faster when unencumbered by large amounts of data. Further, the synchronization process should be able to efficiently sort the subset from what can often be a substantially greater amount of data within the central database 12.

Additionally, the synchronization process should allow changes to the distribution rules to be readily implemented. Further still, the synchronization process should be able to operate regardless of whether the data structures in the central database 12 and the mobile device are the same or not. Lastly, the synchronization process should be able to recognize updates made to data on the mobile device and synchronize those updates to the central computer system.

FIG. 2 represents a typical data storage structure for related objects in a database, as may be used in a central database, according to the prior art. An object is a collection of data arranged in a particular manner, such as a table with rows and columns where each row represents a different record and each column entry contains the same attribute such as a date, a name, a value, etc. In FIG. 2 multiple object types 22, 24, and 26 are represented, where each object type 22, 24, and 26 is specific to a particular type of data record. As shown, multiple objects can exist of each object type. In a business context, for example, object types 22, 24, and 26 can include contact information for individuals, product information for companies, and sales records.

As shown in FIG. 2, each object type 22, 24, and 26 includes a primary key 28 that is a field dedicated to a unique identifier. For an object type that represents data about customers, the primary key 28 would be a unique customer number for each customer. Each object type 22, 24, and 26 also includes fields for data entries 29. For an object type that represents data about customers, for example, data entries 29 can include the number of years the customer has been a purchaser, the customer's field of business, and so forth.

Additional fields within an object type 22 and 24 can be used to relate different object types 22, 24, and 26 together. In FIG. 2 object type 22 includes a first foreign key 30 that links object type 22 to object type 24, and a second foreign key 32 that links object type 22 to object type 26. Similarly, object type 24 is also linked to object type 26 by the second foreign key 32. As can be seen from FIG. 2, an object type can include any number of foreign keys or no foreign keys. As with primary keys 28, a foreign key 30 and 32 is a field dedicated to a unique identifier in the target object type. Referring again to a business context, object type 22 may represent corporate clients, object type 24 may represent primary contact individuals, and object type 26 may represent street addresses. In this context foreign key 30 can be the primary key 28 for object type 24 and foreign key 32 can be the primary key 28 for object type 26. Accordingly, a record in object type 22 may provide information about XYZ Corporation including a street address for the corporate headquarters and the name of a primary contact person at XYZ Corporation. The field for the primary contact person would simply be foreign key 30, and the field for the street address would be foreign key 32. In the case where the primary contact person for XYZ Corporation has an office at the corporate headquarters, the particular street address record referenced by foreign key 32 will be the same, otherwise, the object type 22 record for XYZ Corporation will reference one address record of object type 26 while the object type 24 record for the primary contact will reference a second address record in object type 26.

Returning now to the issue of synchronization between a mobile device and a central database 12, several methods already exist to distribute data to a mobile device. Perhaps the oldest and most simplistic method is to run an extract program that contains a set of distribution rules. The extract program sequentially reviews every object in the central database 12 and if a particular object meets the distribution rules then the object is copied to a dataset that is later transferred to the mobile device. Since the extract program reviews every object in the central database 12, this method of synchronization becomes increasingly inefficient as the size of the central database 12 gets larger.

Another method for achieving a synchronization is to use a publish/subscribe mechanism. In this method a subscription list associates a mobile device with the entire set of object types that may be required by the mobile device. The distribution list may contain further rules to limit how many objects of any particular object type are actually published to the mobile device during the synchronization. In yet another method for achieving a synchronization a set of distribution rules are encapsulated within each object type. Here, when a mobile device requests an object type, the distribution rules are executed to determine which objects of that object type are actually provided.

As noted above, an additional issue for mobile devices is their limited storage capacities. Accordingly, it is desirable to store on a mobile device only a subset of the data available from the central database 12. Hammond (U.S. Pat. No. 5,758,337) discloses a solution where the same data structure, and hence the same object relationships, are maintained in both the central database 12 and the mobile device. In Hammond the object relationships are arranged in tables. The process of Hammond begins by generating on the mobile device an empty replica of the original database schema. Filters are then applied to the tables of the original central database to select desired rows and all related rows to partially populate the database replica. By maintaining referential integrity in this way, Hammond essentially requires that the same application be used to access the replicated database on the mobile device as was used to access the original database. Further, because object relationships are arranged in tables, computation-intensive table join operations are required to access object relationship information stored on the mobile device.

Accordingly, there is a need for a method to distribute data to a mobile device from a central database that is capable of efficiently identifying only that subset of data that is necessary to the mobile device. Further, the method should be independent of whether the database structures are the same in the central database and the mobile device. Further still, the method should preserve the object relationship information at the mobile device.

SUMMARY

The present invention provides a method for synchronizing a mobile device with a central computer system. The central computer system includes an application server in communication with a web server that allows the central computer system to be accessed by the mobile device over a network. The application server runs application software that represents data in terms of objects. In some embodiments objects on the application server are stored and used in a relational format and are referred to, therefore, as components. The mobile device also runs application software that represents data in terms of objects, but here the objects are stored and used in an object-like format. In other embodiments objects on the application server are also stored and used in an object-like format.

A component includes a series of attributes, but for some applications on the mobile device a related object that is copied from the component may comprise only a subset of the total number of attributes. A component interface is used to define which attributes comprise an object derived from a component. The component interface also defines relationships between different components. The content and structure of components, objects, and component interfaces are defined by meta-data, and specific values are provided as instance data. Components having the same structure are considered to be of the same component type, and objects having the same structure are considered to be of the same object type.

The application server includes a sync server in communication with the web server. The mobile device includes a sync processor within a mobile agent. The sync server and the sync processor together perform several functions during a synchronization including determining which objects need to be synchronized to the mobile device. Once an object is selected as one that needs to be synchronized, the sync server or the sync processor determines whether that object already exists on the mobile device, and if so, whether or not any updates have taken place to either the corresponding component on the application server or the object on the mobile device. The sync server or the sync processor also can resolve situations that arise when updates have occurred.

The method of the invention includes coupling a mobile device to an application server of the central computer system, defining a sync list including a candidate object type, synchronizing a relevant object of the candidate object type to the mobile device, determining a referenced object type from the relevant object type, and synchronizing a referenced object of the referenced object type to the mobile device.

Coupling the mobile device to the application server includes making the central computer system accessible over a network, such as the Internet, coupling the mobile device to the network, identifying a user of the mobile device to the central computer system, and establishing a connection between the mobile device and the application server. Establishing a connection between the mobile device and the application server includes establishing a connection between the web server and a sync server of the application server. Making the central computer system accessible over the network includes configuring a web server to be in communication with the network, and further includes having the web server specify an address, such as a URL, by way of a sync gateway servlet. Identifying the user of the mobile device to the central computer system includes having the mobile device transmit identifying indicia to the web server that can uniquely identify the mobile device and the user, such as a user ID, a password, and a device type.

A sync list is a list of candidate object types that is used as a starting point in the process of selecting relevant objects and referenced objects to synchronize with the mobile device. Defining a sync list includes identifying a component interface associated with a candidate object type. In some embodiments meta-data associates the component interface with the candidate object type. In some embodiments a sync list is derived from one or more access control lists where an access control list serves as a subscription to a set of related objects through a list of component interfaces. In some embodiments a user of a mobile device is associated with one or more access control lists by a role, and in some embodiments the role is derived from a user definition associated with a user ID. Thus, according to a user's roles, the user is authorized to access those object types associated with the component interfaces on the various access control lists associated with each role. A sync list can therefore be defined by aggregating together all of the component interfaces found on the various access control lists, and the objects defined by those component interfaces will be the initial candidates for distribution.

Synchronizing a relevant object of the candidate object type to the mobile device includes selecting a component interface from the sync list, finding a relevant object, and copying the relevant object to the mobile device. In some embodiments relevant objects are found by application of a rule to the set of components of the component type associated with the selected component interface. Here, a relevant object results from the application of the selected component interface to a component that satisfies the rule.

Synchronizing the relevant object to the mobile device also includes copying the relevant object to the mobile device. In some embodiments copying the relevant object to the mobile device includes determining whether the relevant object is already on the mobile device. Where the relevant object is not present on the mobile device, a copy is transmitted to the mobile device. When the relevant object is present on the mobile device, the sync server determines whether the version on the mobile device is identical to the relevant object, and if so, no further action need be taken. Otherwise, the sync server resolves situations that arise when either or both of the relevant object on the application server and the object on the mobile device have been updated since the prior synchronization. In some embodiments, when all relevant objects of an object type corresponding to a component interface on the sync list have been synchronized to the mobile device, unnecessary objects of that object type are removed from the mobile device.

The method of the invention also includes determining a referenced object type from the relevant object type, and synchronizing a referenced object of the referenced object type to the mobile device. In some embodiments the referenced object type is determined from the relevant object type by determining a referenced component interface from a reference definition associated with the relevant component interface on the sync list. Synchronizing a referenced object of the referenced object type to the mobile device proceeds in the same manner as synchronizing a relevant object to the mobile device.

BRIEF DESCRIPTION OF DRAWINGS

The present invention is illustrated by way of example, and not by way of limitation, in the figures of the accompanying drawings where like reference numerals frequently refer to similar elements and in which.

DETAILED DESCRIPTION OF THE INVENTION

The present invention provides a method for synchronizing data on a mobile device with data on a networked central computer system. To achieve a synchronization, the central computer system identifies an initial type of data used by the mobile device and identifies other types of data that are referenced by the initial data type. The central computer system synchronizes data of the initial data type and of the referenced data types to the mobile device.

The central computer system is a collection of networked computers and storage devices that are commonly found, for example, within large organizations such as a corporation. A user, perhaps an employee of the corporation that spends time away from the desk, may have a desktop computer networked to the central computer system as well as a mobile device such as a PDA that can be intermittently networked to the central computer system. The mobile device is made to perform similarly to the desktop computer by providing the mobile device with similar application software to that available on the desktop computer. However, data that is useable by the application software is subject to be changed both on the mobile device and on the central computer system when the mobile device is not networked to the central computer system. Accordingly, a synchronization between the central computer system and the mobile device serves to keep the data up-to-date.

Figure 1:
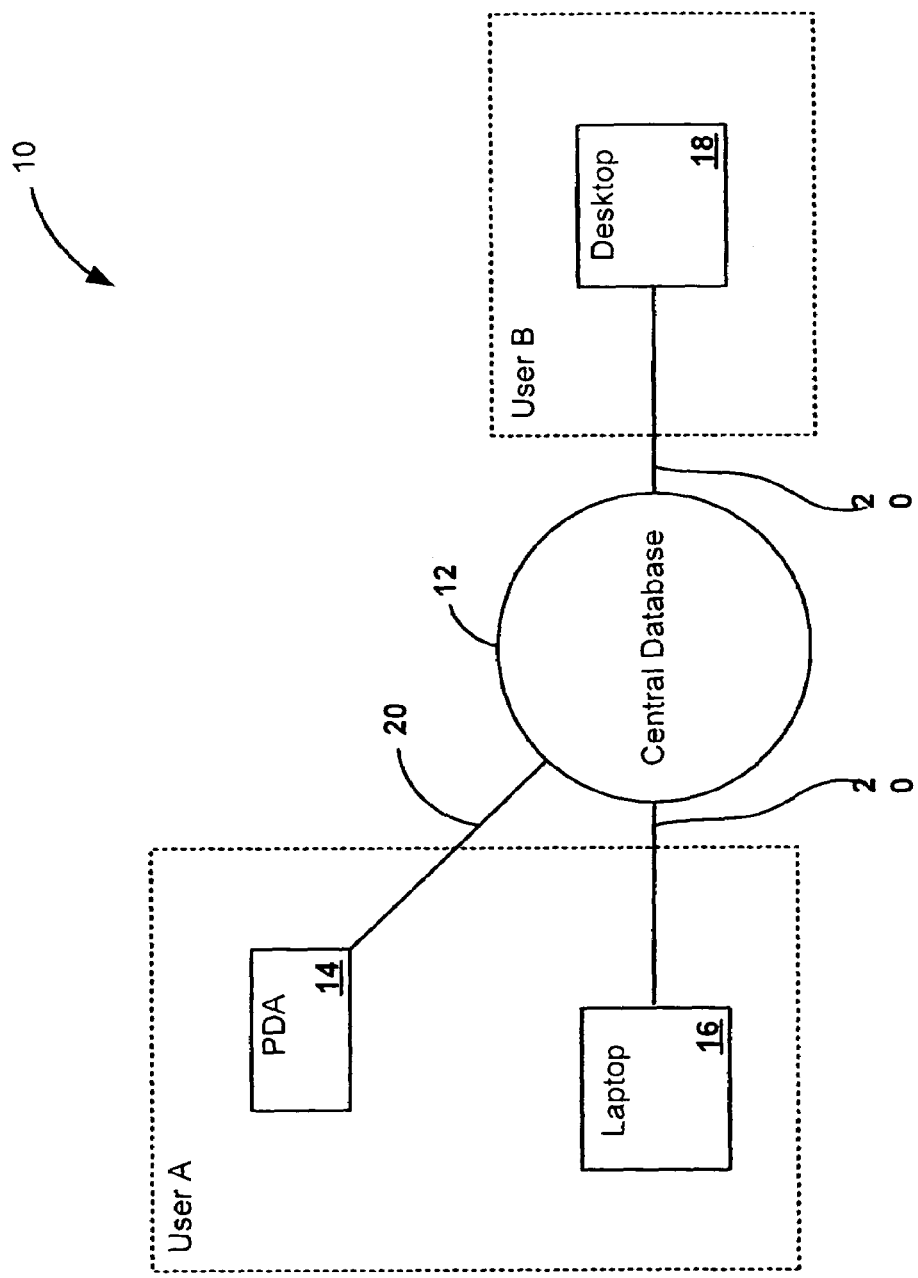
FIG. 1 is a networked computer system of the prior art.
Figure 2:
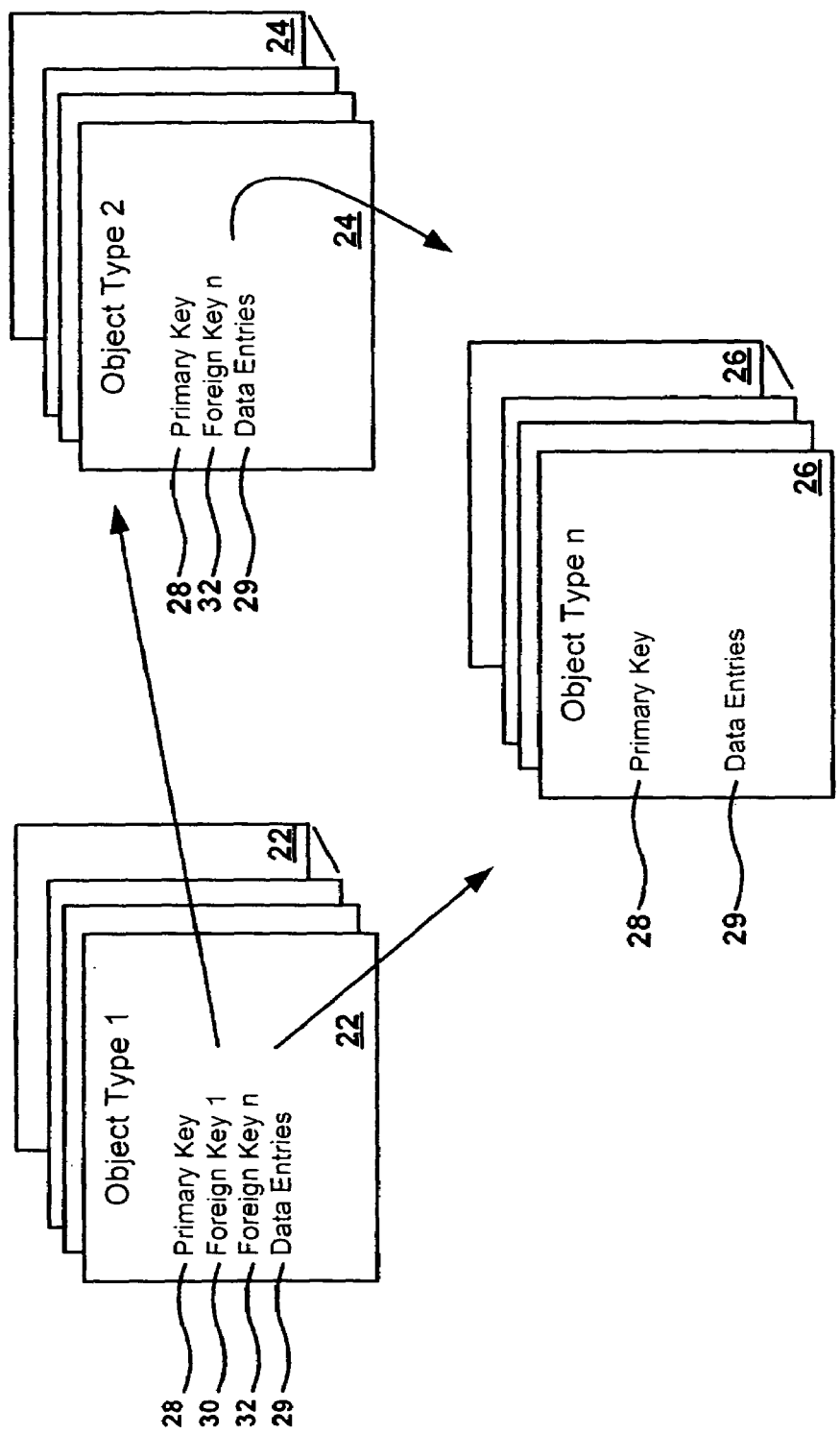
FIG. 2 shows data represented as objects in a database according to the prior art.
Figure 3:
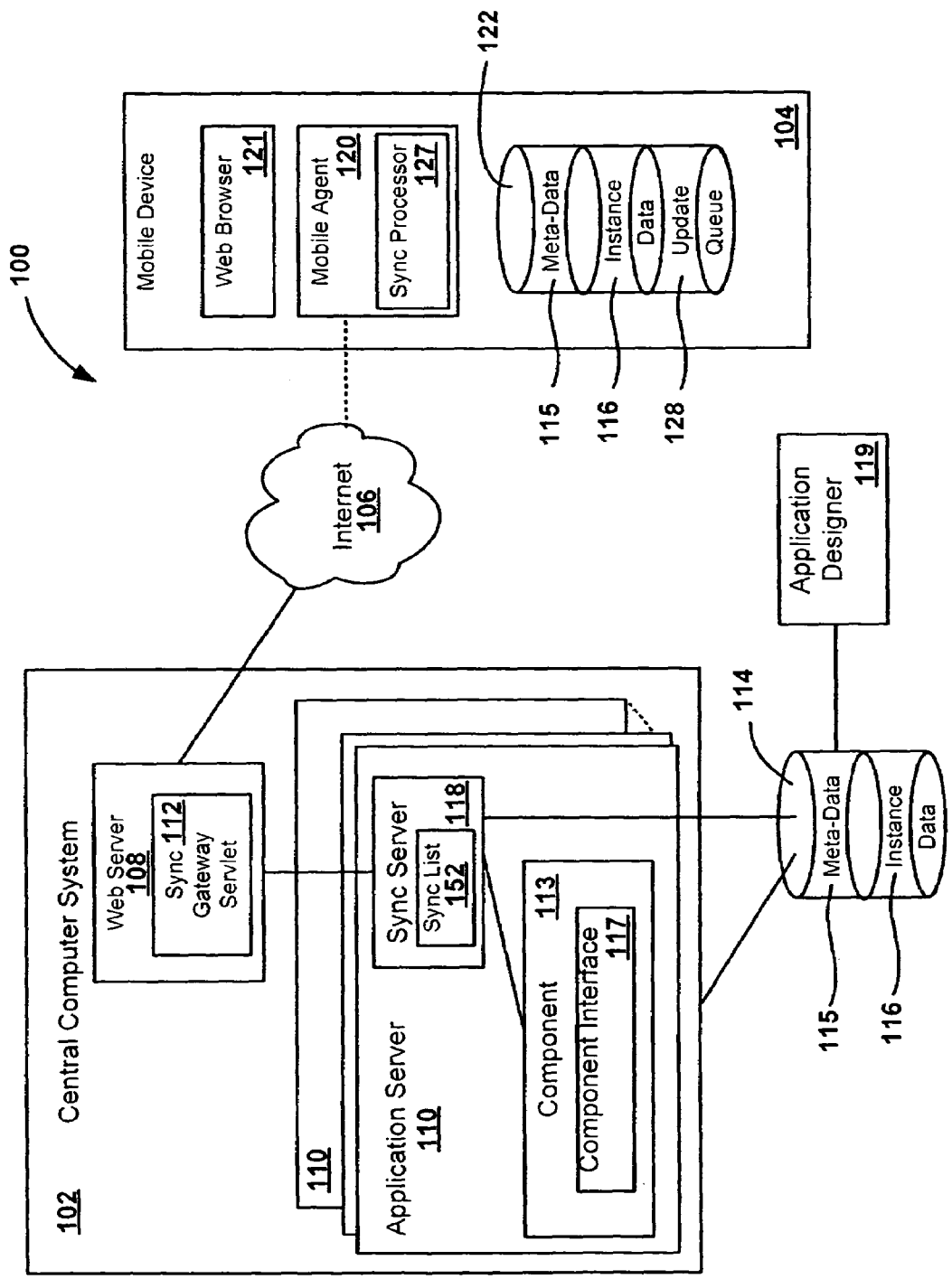
FIG. 3 is a network according to an embodiment of the invention.

To better set forth the invention, aspects of the networked computing environment will first be described in greater detail. FIG. 3 shows a network 100 comprising a central computer system 102 in communication with a mobile device 104 across a Local Area Network (LAN) or a Wide Area Network (WAN) such as the Internet 106. The central computer system 102 includes a web server 108 in communication with a plurality of application servers 110. The web server 108 further includes a synchronization (sync) gateway servlet 112 that establishes connections and that specifies an address such as a URL to the Internet 106 so that the web server 108 can be located and accessed by the mobile device 104. In FIG. 3 a solid line is used to represent the link between the web server 108 and the Internet 106 to indicate that the link is continuously maintained. A dashed line is used to represent the link between the mobile device 104 and the Internet 106 to indicate that the link is temporary.

Figure 4:
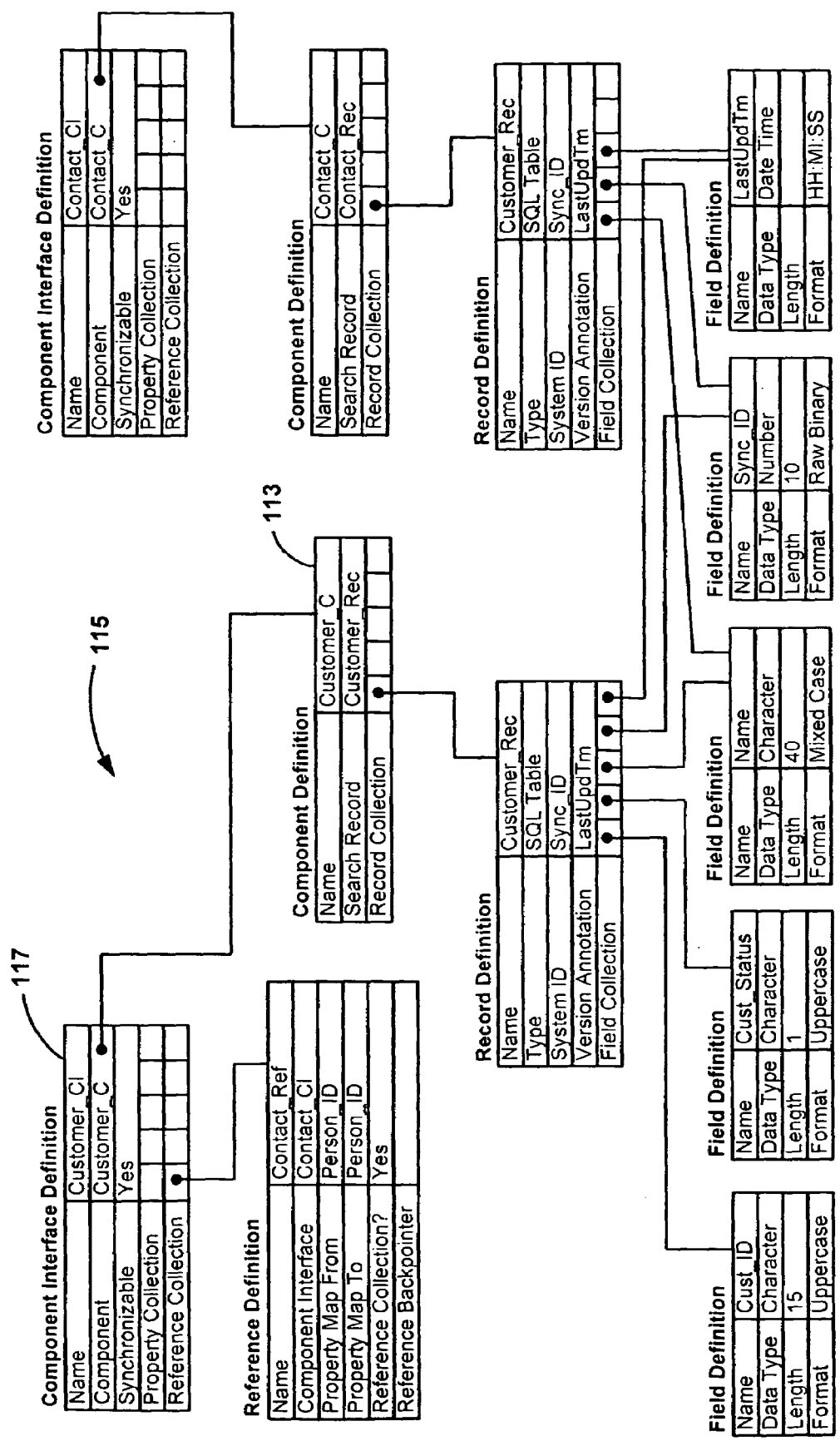
FIG. 4 is a depiction of sample application meta-data.

With continued reference to FIG. 3, each application server 110 may be a separate server, or may be a partition of a larger server such as an enterprise server, or may be distributed across several servers. Application software (not shown) running on the application server 110 is configured to represent and manipulate data in the form of components 113. Each component 113 is a collection of records and application processing logic. A component 113 is associated according to its component type with one or more component interfaces 117. Each component interface 117 defines an object from the associated component 113. Thus, multiple objects can be defined from one component 113 by the use of multiple component interfaces 117. The content and structure of each component 113 and each component interface 117 are defined by meta-data 115, and specific values are provided as instance data 116. As will be discussed below with respect to FIG. 14, relationships between component interfaces 117 are also defined by meta-data 115. FIG. 4 provides an example of meta-data 115 for two component interfaces 117, two components 113, and some related definitions.

Components 113 are stored in a component store 114 that can be, for example, a dedicated storage device within the application server 110, a storage device shared by several application servers 110, a network attached storage device (NAS), a storage area network (SAN) connected to the application server 110, or a database stored on any of these devices. An application designer 119 is coupled to the component store 114. The application designer 119 is used, for example, to specify and update the meta-data 115. It will be appreciated that changes to the meta-data 115 including changes to the relationships between component interfaces 117 can be readily implemented from the application designer 119.

Each application server 110 includes a sync server 118 in communication with the web server 108. A component interface 117 exposes a component 113 to the sync server 118 so that an object defined by the component interface 117 can be copied to the web server 108 and from there to the mobile device 104. The sync server 118 is a processor that performs several functions during a synchronization. The sync server 118 determines which object types need to be synchronized during a synchronization and includes those object types in a sync list 152. In preferred embodiments the sync list 152 includes a list of component interfaces 117 associated with the object types sought to be synchronized. Methods for selecting appropriate component interfaces 117 for the object types on the sync list 152 will be discussed below with respect to FIGS. 8 and 9.

In preferred embodiments, mobile device 104 includes a mobile agent 120, a web browser 121, and an object store 122. Application software (not shown) running on the mobile device 104 is configured to represent and manipulate data in the form of objects that are stored in the object store 122. Objects in the object store 122 are represented by meta-data 115 and instance data 116. The object store 122 also includes an update queue 128, discussed later with respect to FIG. 12. The mobile agent 120 uses meta-data 115 to format instance data 116 into, for example, HTML to be displayed by the web browser 121. The web browser 121 displays this content on the mobile device 104 by rendering an application user interface. Mobile agent 120 further includes a sync processor 127 that is used during a synchronization to connect the object store 122 with the central computer system 102. During the synchronization the sync processor 127 may perform other functions, as will also be discussed below.

In preferred embodiments the sync server 118 communicates the sync list 152 and meta-data 115 associated with the component interfaces 117 to the sync processor 127 for processing. The sync processor 127 identifies relevant objects for each object type on the sync list 152 according to relevance rules included in the application processing logic in the component interfaces 117 that are associated with the object types on the sync list 152. When a relevant object satisfying the relevance rules is identified, sync processor 127 requests instance data 116 for the relevant object from the sync server 118 and processes the instance data 116 to resolve out-of-date situations and conflict situations, both discussed in more detail with reference to FIGS. 11–13. Sync processor 127 also determines referenced object types by following reference rules specified in the application processing logic included in the component interfaces 117, as will be discussed with respect to FIG. 14. It should be appreciated that in other embodiments the sync server 118 may retain the sync list 152 and perform the functions attributed here to the sync processor 127.

It should be noted that the term "component" is used for data on the application server 110 side while "object" is used on the mobile device 104 side. This distinction is maintained to show that in preferred embodiments data is stored and used in a relational format on the application server 110 side, whereas on the mobile device 104 side data is stored and used in an object-like format. It will be appreciated that the object-like format may also be used on the application server 110 side.

Figure 5:
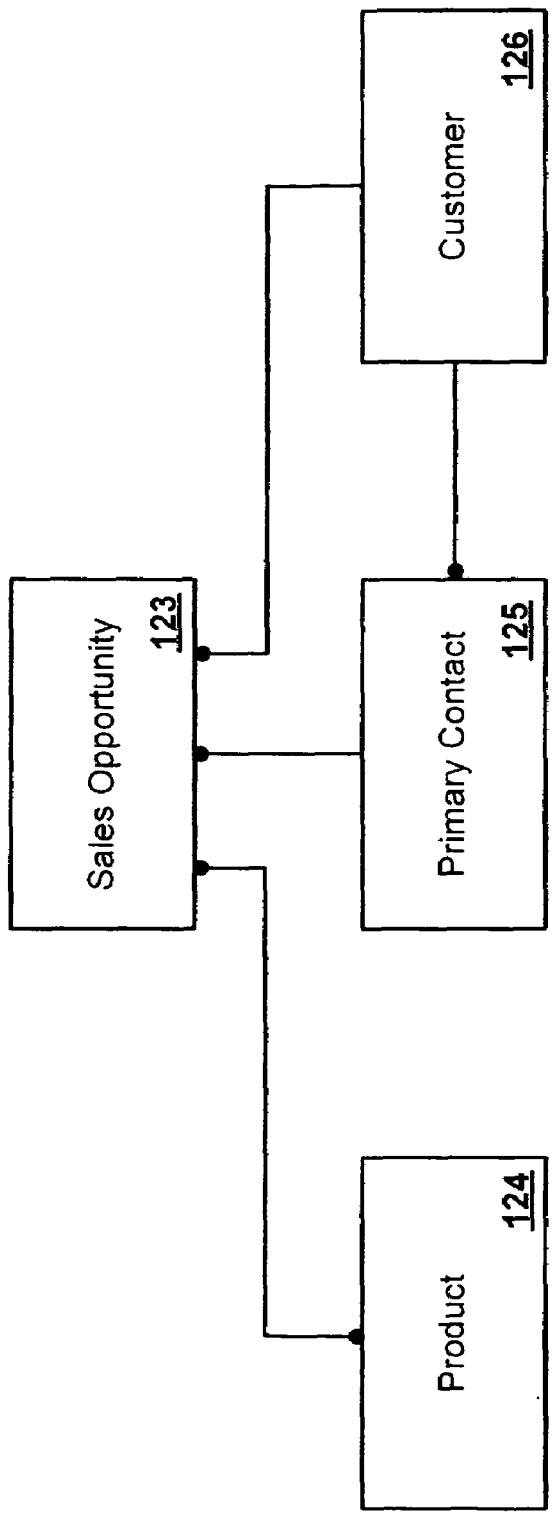
FIG. 5 shows relationships between component types according to an embodiment of the invention.

FIG. 5 illustrates a set of related component types. In a synchronization process of the present invention, a list of candidate component types serves as a starting point, and objects derived from components 113 of the candidate component types can therefore be distributed to the mobile device 104. Additionally, components 113 of other component types can be found by references from the candidate component types found in the meta data 115, as will be discussed in greater detail below. By comparison to the publish/subscribe mechanism for synchronization of the prior art, the invention allows for a reduced number of distribution rules, described herein as reference rules and relevance rules. In some instances specifying a single component interface 117 is sufficient to identify all required relevant and referenced objects of numerous object types.

In FIG. 5 a candidate component type 123 refers to referenced component types 124, 125 and 126. A dot is used in FIG. 5 to indicate that a plurality of components 113 of one component type may be linked to a single component 113 of another component type. For example, the candidate component type 123 is denoted as "Sales Opportunity" to indicate that a component 113 of candidate component type 123 represents data about a sales opportunity that may be important to a salesperson. Since a sales opportunity may refer to a product, candidate component type 123 is linked to referenced component type 124, denoted "Product." Additionally, since a sales opportunity can refer to a plurality of different products, the link from candidate component type 123 to component type 124 shows a dot at component type 124 to indicate that more than one component 113 of component type 124 may be referenced by a component 113 of candidate component type 123. Likewise, a component 113 of component type 124 for a specific product can reference more than one sales opportunity, hence a second dot is shown at candidate component type 123 on the link between candidate component type 123 and component type 124.

With continued reference to FIG. 5, since a sales opportunity may indicate a prospective customer, candidate component type 123 is linked to component type 126, denoted "Customer." The link between candidate component type 123 and component type 126 is marked with a dot at candidate component type 123 to indicate that a customer may reference more than one sales opportunity. Lastly, component type 125 for "Primary Contact" is linked to both candidate component type 123 and component type 126. Here, for each sales opportunity there is only one primary contact, but a dot on the link at candidate component type 123 indicates that any primary contact component of component type 125 can refer to more than one sales opportunity. A dot on the link between component types 125 and 126 indicates that any primary contact component will reference only one customer component, but each customer component may reference more than one primary contact component.

Figure 6:
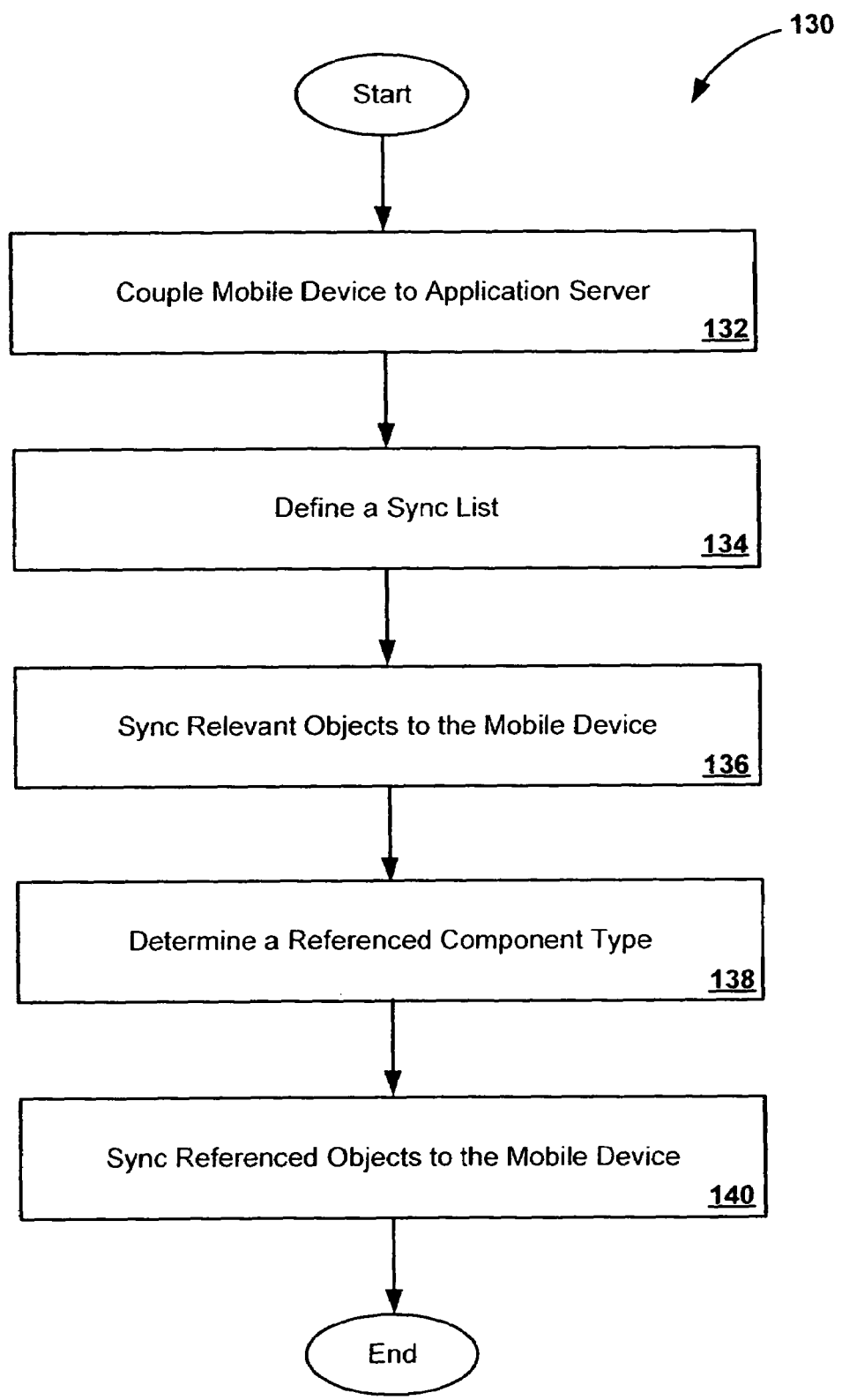
FIG. 6 is a flow chart showing a method for synchronization according to an embodiment of the invention.

FIG. 6 shows an exemplary method 130 of the invention in flow-chart form. The method 130 for synchronizing a mobile device with a central computer system includes coupling the mobile device to an application server of the central computer system 132, defining a sync list 134, synchronizing relevant objects to the mobile device 136, determining a referenced component type 138, and synchronizing referenced objects to the mobile device 140.

Figure 7:
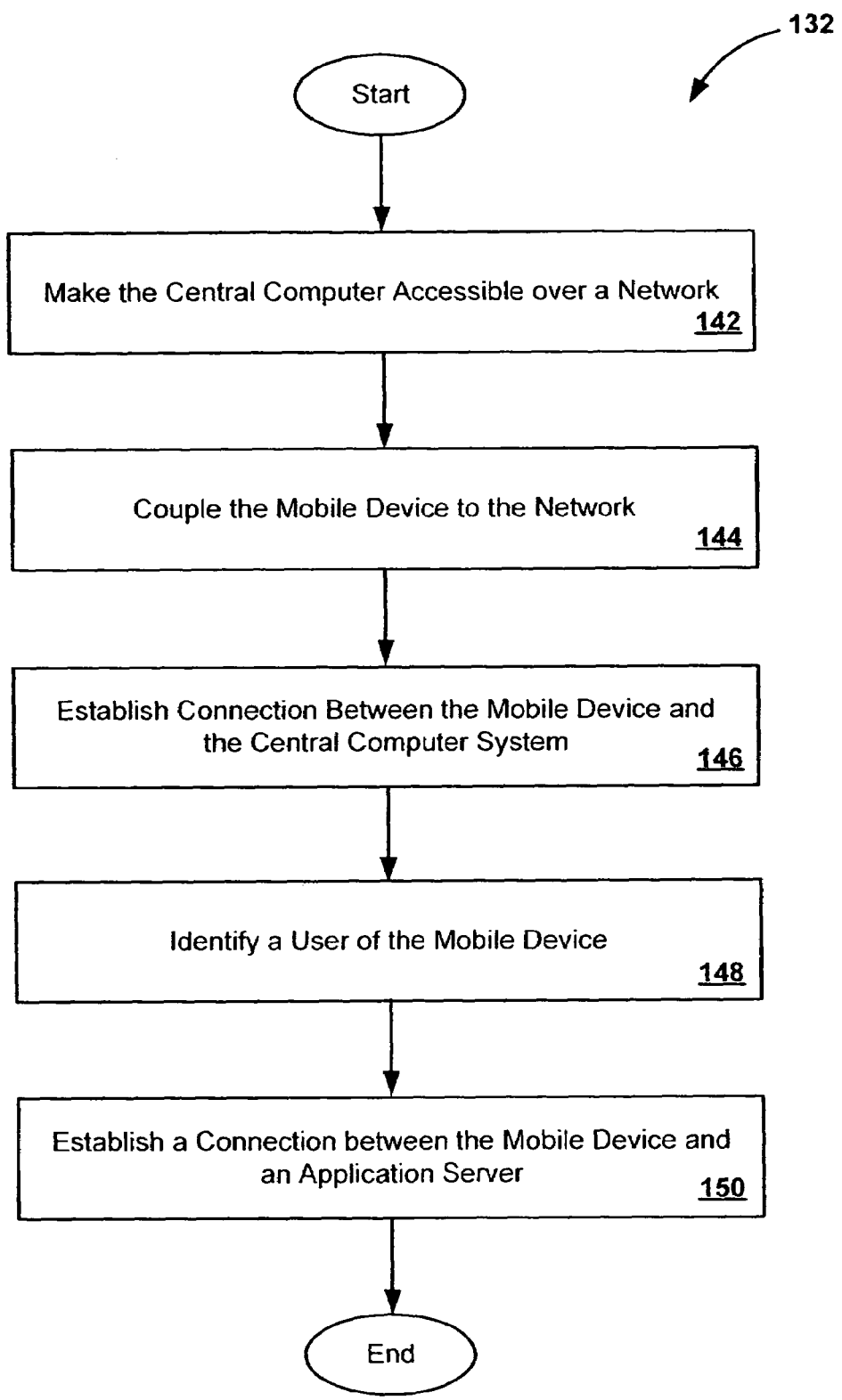
FIG. 7 is a flow chart showing a method for coupling a mobile device to an application server according to an embodiment of the invention.

With reference to FIGS. 3 and 7, coupling the mobile device 104 to an application server 110 includes making the central computer system accessible over a network 142, coupling the mobile device to the network 144, establishing a connection between the mobile device and the central computer system 146, identifying a user of the mobile device to the central computer system 148, and establishing a connection between the mobile device and an application server 150. Making the central computer system accessible over the network can include configuring a web server 108 in communication with a plurality of application servers 110 to be in further communication with the network. In some embodiments the network is a public Wide Area Network (WAN) such as the Internet 106. In other embodiments the network can be a private Local Area Network (LAN) or WAN. Making the central computer system accessible over the network can also include having the web server 108 specify an address such as a URL by way of a sync gateway servlet 112. The URL allows the web server 108 to be located and accessed across the Internet 106. In some embodiments the sync gateway servlet 112 acts as a sync request router to direct a synchronization request to an appropriate application server 110 from a plurality of possible application servers 110.

With continued reference to FIGS. 3 and 7, coupling the mobile device 104 to the network can include coupling the mobile agent 120 of the mobile device 104 to the Internet 106. The coupling can be achieved via a modem (not shown) accessible to the mobile agent 120, where the modem can be, for example, a dial-up modem or a wireless modem. In other embodiments the coupling can be achieved via a LAN adapter to a Local Area Network. Establishing a connection between the mobile device 104 and the central computer system 102 can include having the mobile agent 120 specify the URL of the sync gateway servlet 112. Once a connection to the web server 108 has been established, data can be passed in both directions between the mobile device 104 and the central computer system 102.

With continued reference to FIGS. 3 and 7, identifying a user of the mobile device 104 to the central computer system 102 includes having the mobile device 104 transmit identifying indicia, such as a user name, password, and device type (e.g., laptop, PDA, etc.), that can uniquely identify either the mobile device 104 or the user and provide application security. Establishing a connection between the mobile device 104 and an application server 110 includes having sync gateway servlet 112 route sync requests to a desired application server 110 and establishing a connection between the sync server 118 of the desired application server 110 and the web server 108. The desired application server 110 can be specified, for example, by a domain specification within a configuration of the sync gateway servlet 112. Once the web server 108 has made a connection to the desired application server 110, the identifying indicia can be further supplied from the mobile device 104 to the desired application server 110.

Figure 8:
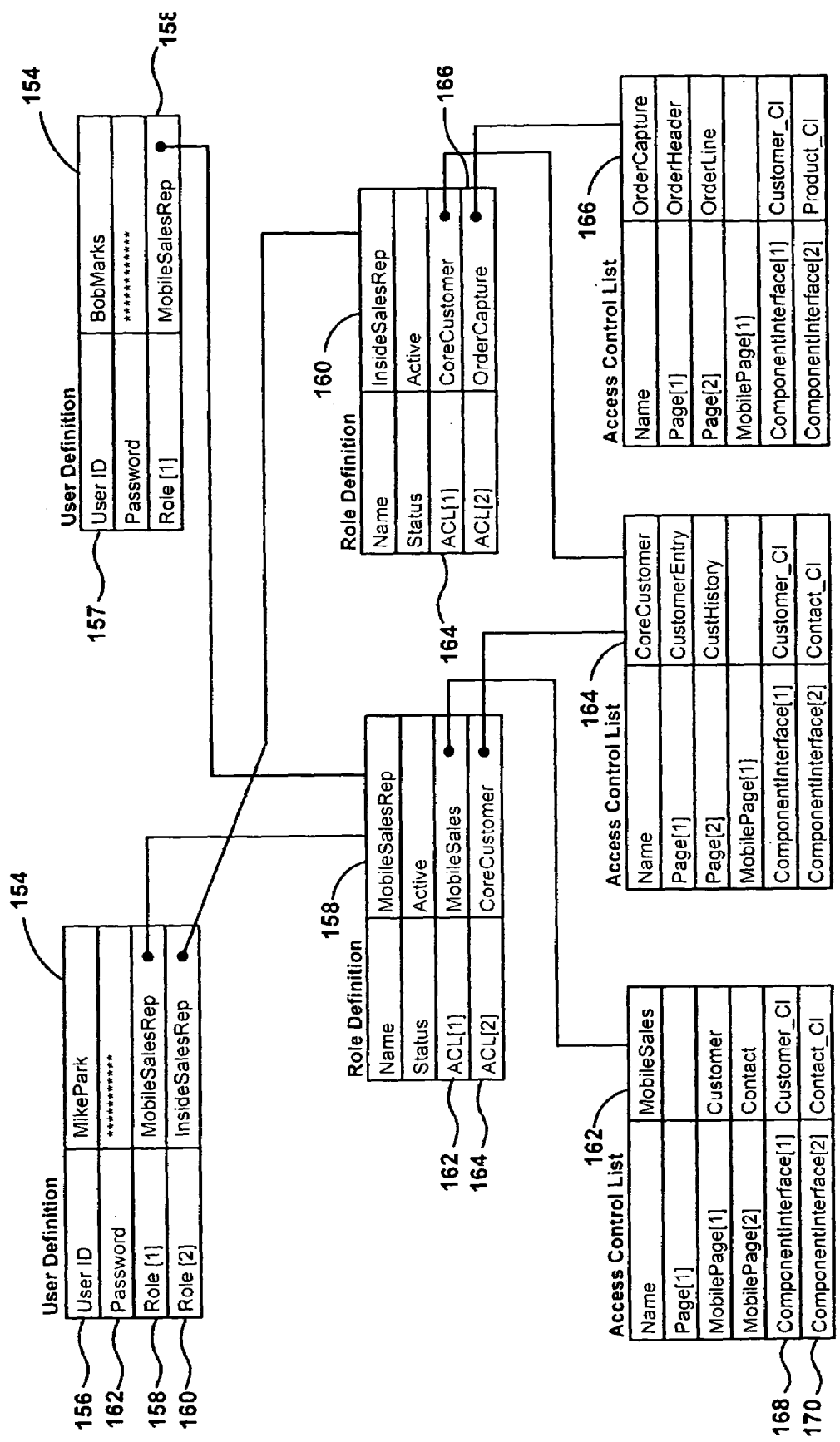
FIG. 8 shows meta-data from which a sync list can be defined according to an embodiment of the invention.

Referring again to FIG. 6, once the mobile device 104 is coupled to the application server 110, the method 130 proceeds by defining a sync list 152 (FIG. 3) at the sync server 118. The sync list 152 is a list of candidate component types 123 that are used as starting points in the distribution of relevant objects to the mobile device 104. More specifically, the sync list 152 is a list of component interfaces 117, where each component interface 117 is associated with a candidate component type 123 (FIG. 5). FIG. 8 shows an example of meta-data from which the sync list 152 can be defined, according to one embodiment of the invention. A user definition 154 is meta-data that associates, for example, an ID 156 with a set of roles 158, 160. In the given example, user ID 156 has authorization for two roles 158 and 160 while user ID 157 has authorization for only one role 158. The user definition 154 can also include other information such as a password 162.

Figure 9:
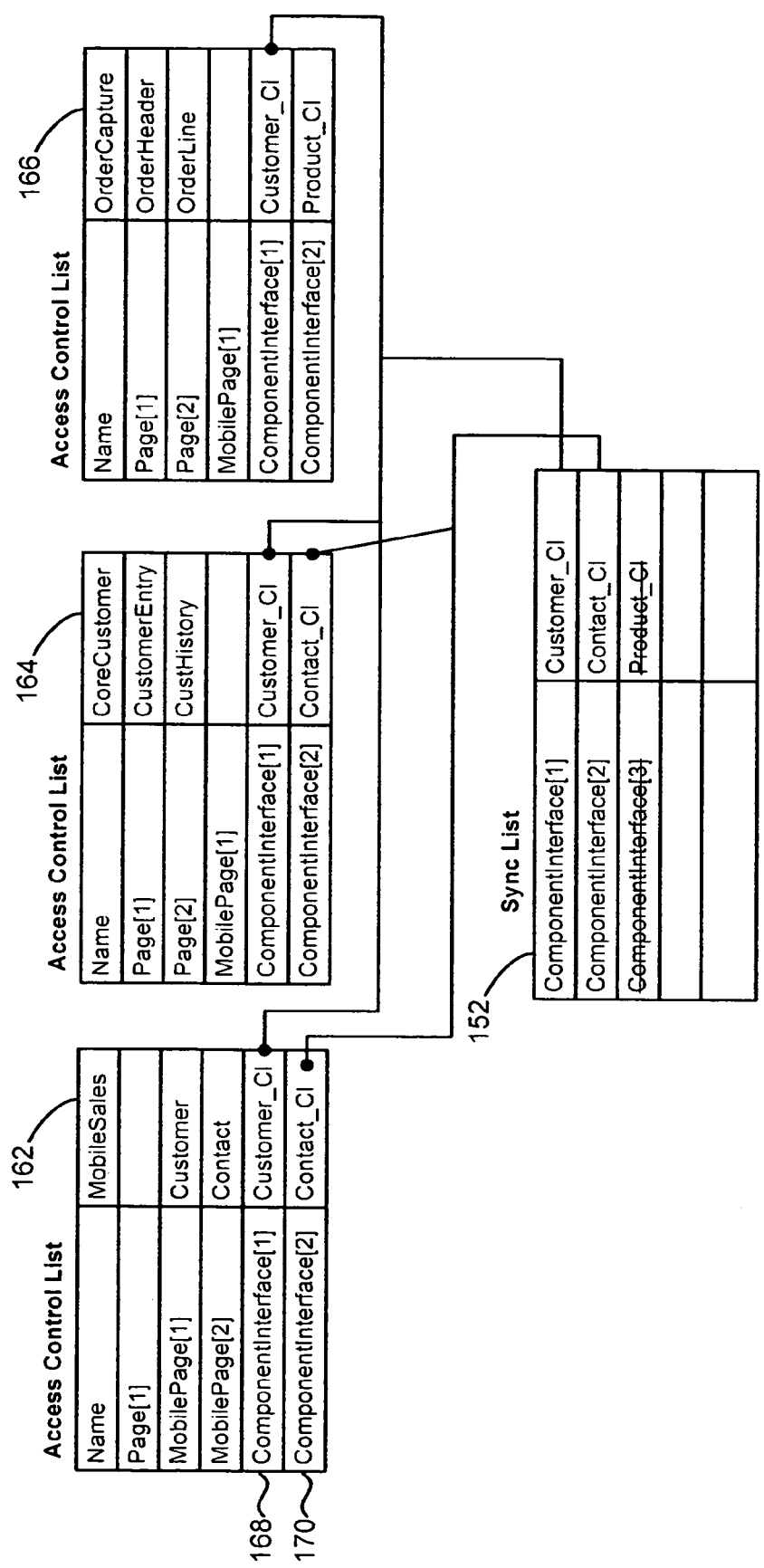
FIG. 9 is an exemplary sync list according to an embodiment of the invention.

Each role 158, 160 associates together a set of access control lists 162, 164, 166. Each access control list 162, 164, 166 can be thought of as a subscription to a set of related objects through the component interfaces 168, 170. FIG. 9 shows a sync list 152 derived from the access control lists 162, 164, 166 for user ID 157. Although the three access control lists 162, 164, 166 in this example include six component interfaces, some of the component interfaces 168, 170 are duplicated across the access control lists 162, 164, 166. Accordingly, only two unique component interfaces are noted on the sync list 152 for role definition 158 that is associated with user ID 157. It will be understood that although in the given example User ID 157 has only one associated role 158, when a sync list 152 is defined for a user having multiple roles, all of the roles and all of their associated access control lists are taken into account.

Figure 10:
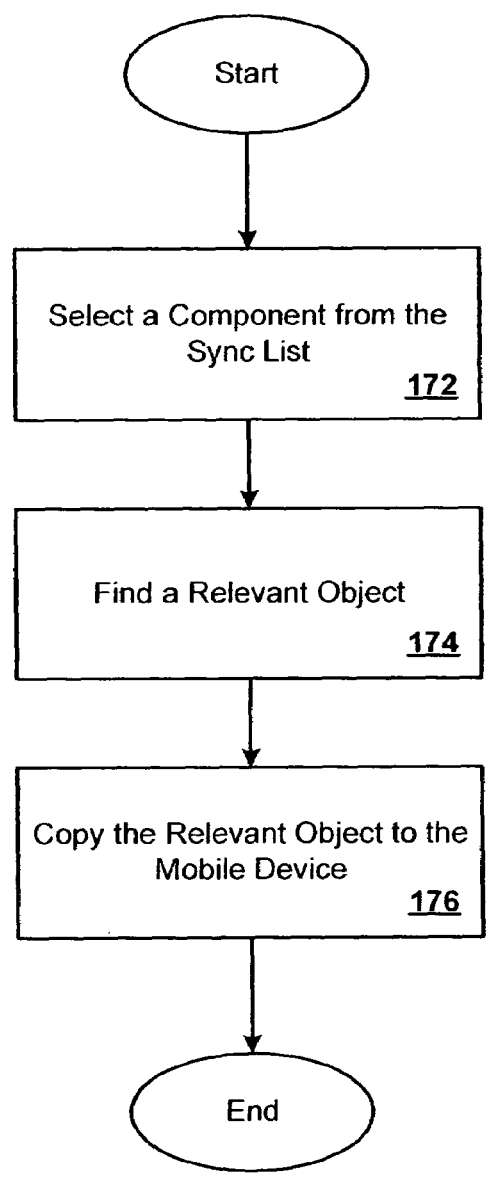
FIG. 10 is a flow chart showing a method for synchronizing relevant objects to a mobile device according to an embodiment of the invention.

Referring again to FIG. 6, once the sync list 152 has been defined, relevant objects can be synchronized to the mobile device 104. As shown in FIG. 10, synchronizing relevant objects to the mobile device 136 includes selecting a component interface from the sync list 172, finding a relevant object 174, and copying the relevant object to the mobile device 176. Selecting a component interface 117 from the sync list 152 is typically performed sequentially starting with the first component interface 117 in the sync list 152 and progressing to the last component interface 117.

Finding a relevant object for the component interface 117 includes locating a component 113 of a component type associated with the component interface 117. For each component interface 117 on the sync list 152, sync processor 127 issues a select request to the sync server 118. The select request can specify the component interface 117, as well as other information such as a user ID 156, 157 (FIG. 8), and a device type of the mobile device 104 (e.g., laptop, PDA). Sync server 118 then executes relevance rules specified by the application processing logic included in the component interface 117 to identify a component 113 that satisfies the relevance rules. As previously noted, the component interface 117 exposes the identified component 113 to the sync server 118 to define a relevant object.

For example, where the candidate component type 123 is sales opportunity (FIG. 5), a relevance rule could specify that only those sales opportunities received after a particular date will be relevant. Relevance rules can depend, for example, on the user ID 156, 157, the device type, limitations set by the user, and any combination of these factors. By application of such relevance rules the number of relevant objects distributed to the mobile device 104 can be constrained.

Synchronizing relevant objects to the mobile device 104 also includes copying a relevant object to the mobile device 104 which can include determining whether the relevant object is already found in the object store 122. If the relevant object does not exist in the object store 122, then the relevant object is transmitted from the sync server 118 to the mobile device 104 and stored in the object store 122. If the relevant object does exist in the object store 122, then copying the relevant object to the mobile device 104 can include determining whether the relevant object to be synchronized is identical to or different from the copy of the relevant object in the object store 122. Here, the two objects may be identical, either object may have been updated, or both objects may have been updated. A method for determining the relationship of a relevant object to an existing copy stored on a mobile device 104 is described below.

Figure 11:
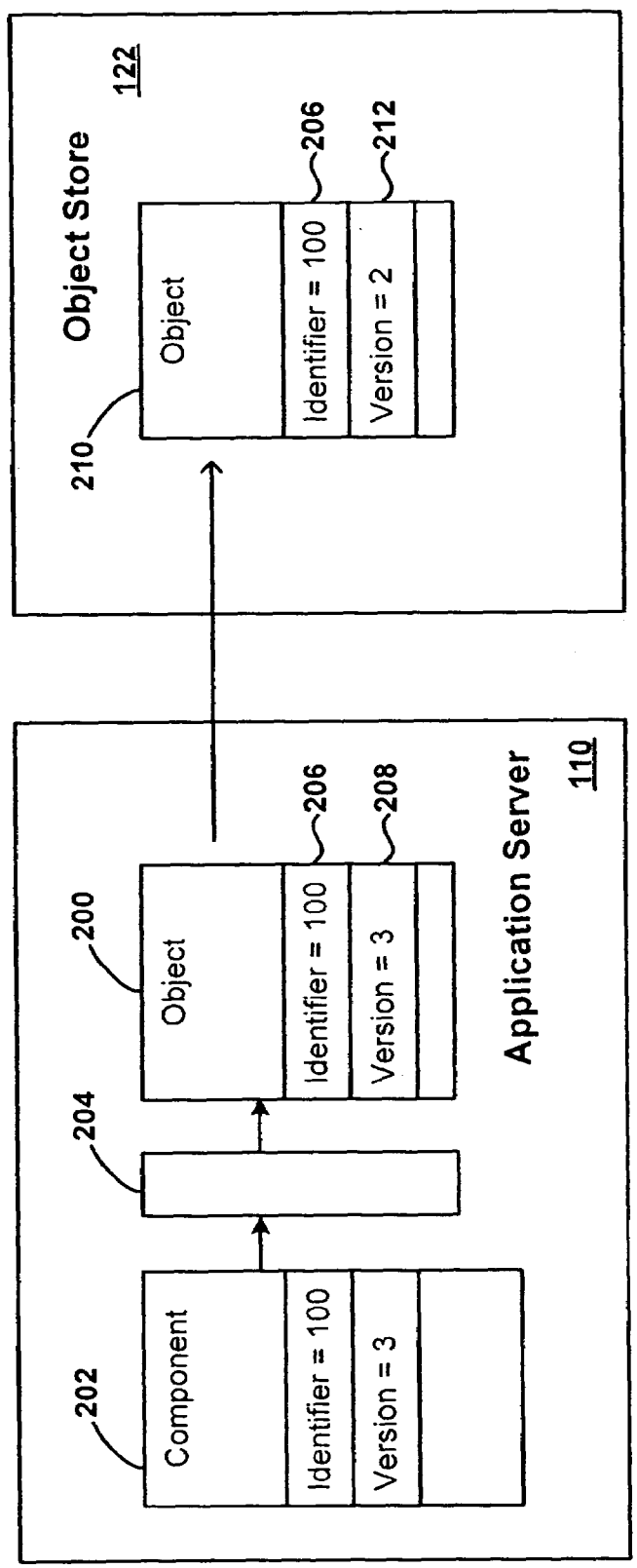
FIG. 11 shows an object to be synchronized and pre-existing alternative versions of the same object on the mobile device prior to a synchronization according to an embodiment of the method of the invention.

FIG. 11 illustrates a set of related objects including an object 200 derived from a component 202 through a component interface 204 within application server 110. Object 200 includes a unique object identifier 206 and a version stamp 208. FIG. 11 also shows a possible copy of object 200, namely object 210, having the same unique object identifier 206 and located in the object store 122 of mobile device 104. Object 210 has a version stamp 212 that is sequentially before version stamp 208, indicating that object 210 is a prior version of object 200. It should be noted that unique object identifier 206 should be unique by object type and immutable so that copies of the same object can continue to be readily identified. It should also be noted that both the object identifier 206 and the version stamp 208, 212 can utilize many different data types such as integer (as shown), date_time, and character. The integer data type is shown herein for convenience, however the date_time data type is more preferred in most embodiments as an internal clock of a computer 102 is a convenient counter to provide unique, ordered values, whereas with the integer version stamp a separate counter mechanism must be devised. For the object identifier 206 it is important that the data type be such that it is capable of providing a unique identification, whereas for the version stamp it is important that the data type be such that it provides unique values with reliable ordering.

With continued reference to FIG. 11, it will be apparent that during a synchronization, when object 200 is identified as a relevant object to be synchronized and the identical object 200 is already present in the object store 122 on the mobile device 104, then there is no need to copy object 200 to the mobile device 104. However, where there is a difference between the version stamps for object 200 and object 210, this can indicate an out-of-date situation. An out-of-date situation is defined as one in which object 200 has been updated since the previous synchronization, while the other object 210 has remained unchanged.

In preferred embodiments the sync processor 127 can detect out-of-date situations by comparing version stamps for objects having the same unique identifier 206. For example, any difference in version stamps between two objects 200 and 210 indicates that the object 210 with the less recent version stamp is out-of-date. When an out-of-date situation is detected, object 200 is copied to the mobile device 104 to replace object 210.

Figure 12:
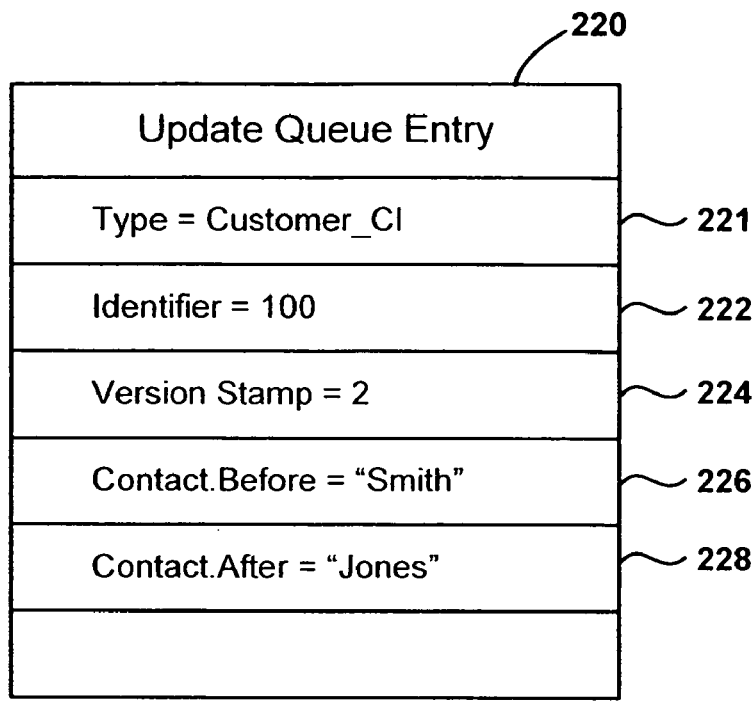
FIG. 12 is an update queue entry according to an embodiment of the invention.

With continued reference to FIG. 11, a conflict situation is defined as one in which both object 200 and object 210 have been modified since the point in time when the object was last synchronized. With Reference to FIGS. 3 and 12, to resolve a conflict situation, the mobile agent 120 is required to maintain an update queue 128. An update queue 128 is a collection of entries, where each entry records changes made to an object 200 during an update. FIG. 12 shows that an update queue entry 220 should include a unique identifier 222, a version stamp 224, and a before attribute 226 and an after attribute 228. The unique identifier 222 should be the same as the unique identifier 206 corresponding to the particular object being updated. In preferred embodiments, version stamps are not changed on the mobile device 104, thus, the version stamp 224 should be the same as the version stamp 212 corresponding to the particular object being updated. The before attribute 226 and the after attribute 228 represent the states of a particular attribute of the object both before and after the update.

In the example in FIG. 12 update queue entry 220 records an update in an object of the "Customer_CI" object type. Objects of the "Customer_CI" object type include an attribute called "contact" that provides the name of a contact person at the customer's office. The before attribute 226 in the present example is the name of a contact before an update and the after attribute 228 is the name of a new contact that replaced the previous contact. For each additional attribute changed during an update an additional pair of before and after attribute values are added to the update queue entry 220.

It should be appreciated that synchronization processing can be simplified by processing update queue entries 220 as the first step in a synchronization session after a sync list 152 has been defined. In this manner, all update conflicts can be detected prior to starting out-of-date processing. Conflict resolution can take many forms and is managed by sync server 118. In preferred embodiments sync processor 127 communicates the contents of the update queue 128 to the sync server 118 for processing. During processing of update queue entries 220, sync server 118 identifies update conflicts by comparing the version stamp 224 of the update queue entry 220 with the version stamp of a component 113 having the same unique identifier 222 within the component store 114. Version stamps with different values indicate an intervening update has occurred to the component 113 since it was last copied to the mobile device 104.

Figure 13:
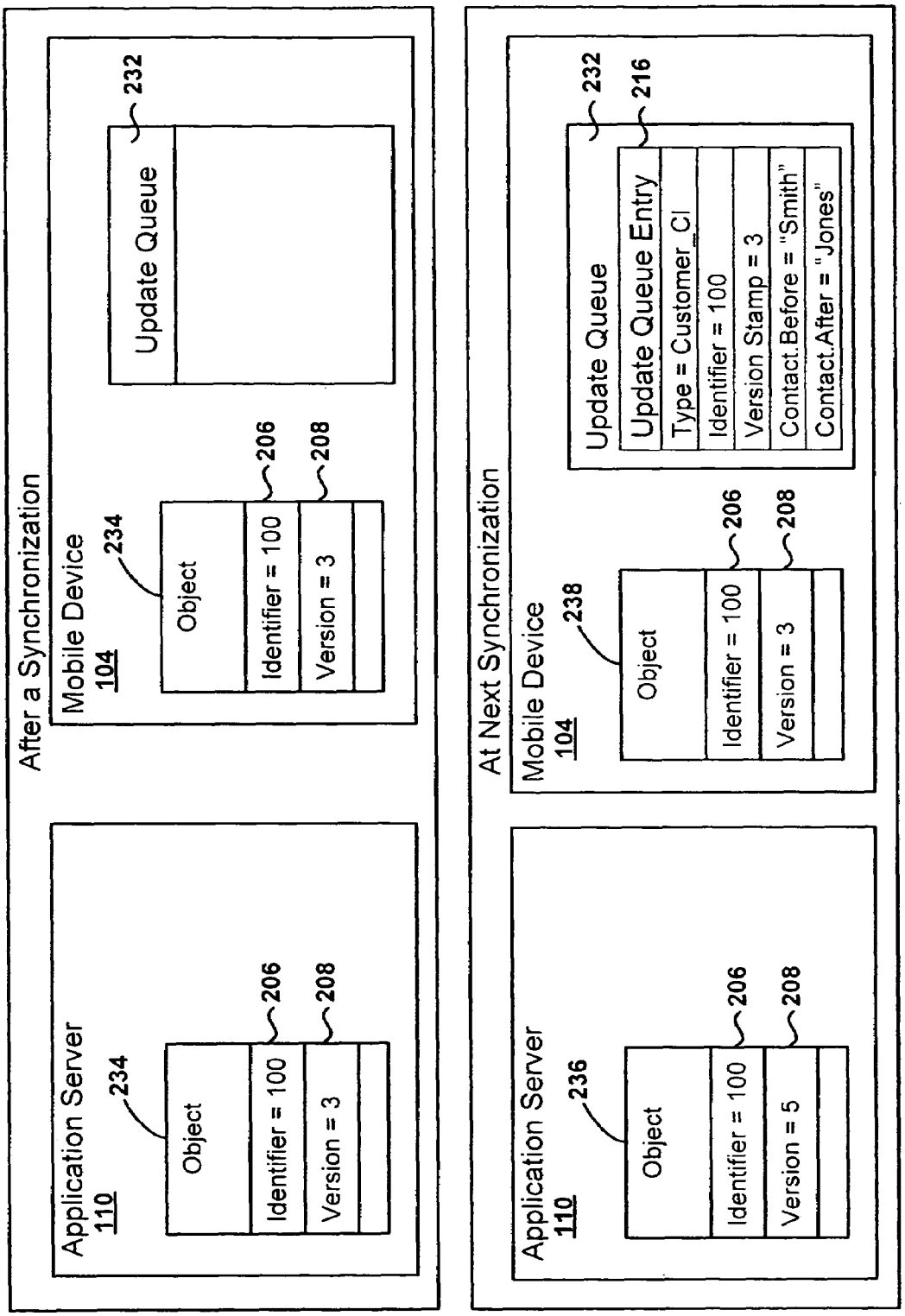
FIG. 13 shows changes that can occur to synchronized objects and associated update queues prior to a subsequent synchronization.

FIG. 13 illustrates update queues 232 and a particular object 234 residing on both an application server 110 and a mobile device 104 both after an initial synchronization and at the time of a subsequent synchronization. It can be seen in FIG. 13 that at the time of the initial synchronization the object 234 is on its third revision, shown by the version stamp equal to 3. The same version of the object 234 is also on the mobile device 104. In the particular example shown in FIG. 13, the object 234 on the application server 110 was updated twice prior to the subsequent synchronization, as shown by object 236 with version stamp 208 now incremented to value 5. Similarly, the object 234 on the mobile device 104 was updated once prior to the subsequent synchronization, and the update queue 232 correspondingly gained one entry.

At the time of the subsequent synchronization in FIG. 13 there is a conflict situation. On the application server 110 the object 234 has been modified to become object 236, while on the mobile device 104 the object 234 has become object 238, thus both have been modified since the initial synchronization and neither object may represent the most up-to-date set of data. For example, one attribute on object 236 may have been updated and a different attribute on object 238 may also have been updated. In a synchronization the update queue 232 indicates which attributes have been changed on object 238 so that the sync server 118 has this information available for conflict resolution processing.

In other situations the same attribute on both objects 236 and 238 will have been independently changed. This can be evidenced by comparing the before value for the attribute in update queue entry 216 with the same attribute on object 236. Differing values indicate independent updates to the same attribute. Regardless of update conflicts to similar or different object attributes, conflict resolution is necessary to determine which value should be retained in the synchronization. Different applications will apply different rules to conflict resolution. One of the more simple rules is to retain the values from either the application server 110 or mobile device 104. Other rules can depend on factors such as the user's role or an assigned object ownership. Still other rules query the user to select the correct value to be retained.

Referring back to FIG. 6, synchronizing relevant objects to the mobile device also includes removing unnecessary objects from the object store 122. After the sync server 118 has found all of the relevant objects of a particular object type from a particular component interface 117 on the sync list 152, those objects in the object store 122 of that object type that were not identified by the sync server 118 are removed from the object store 122 to free up storage space.

Figure 14:
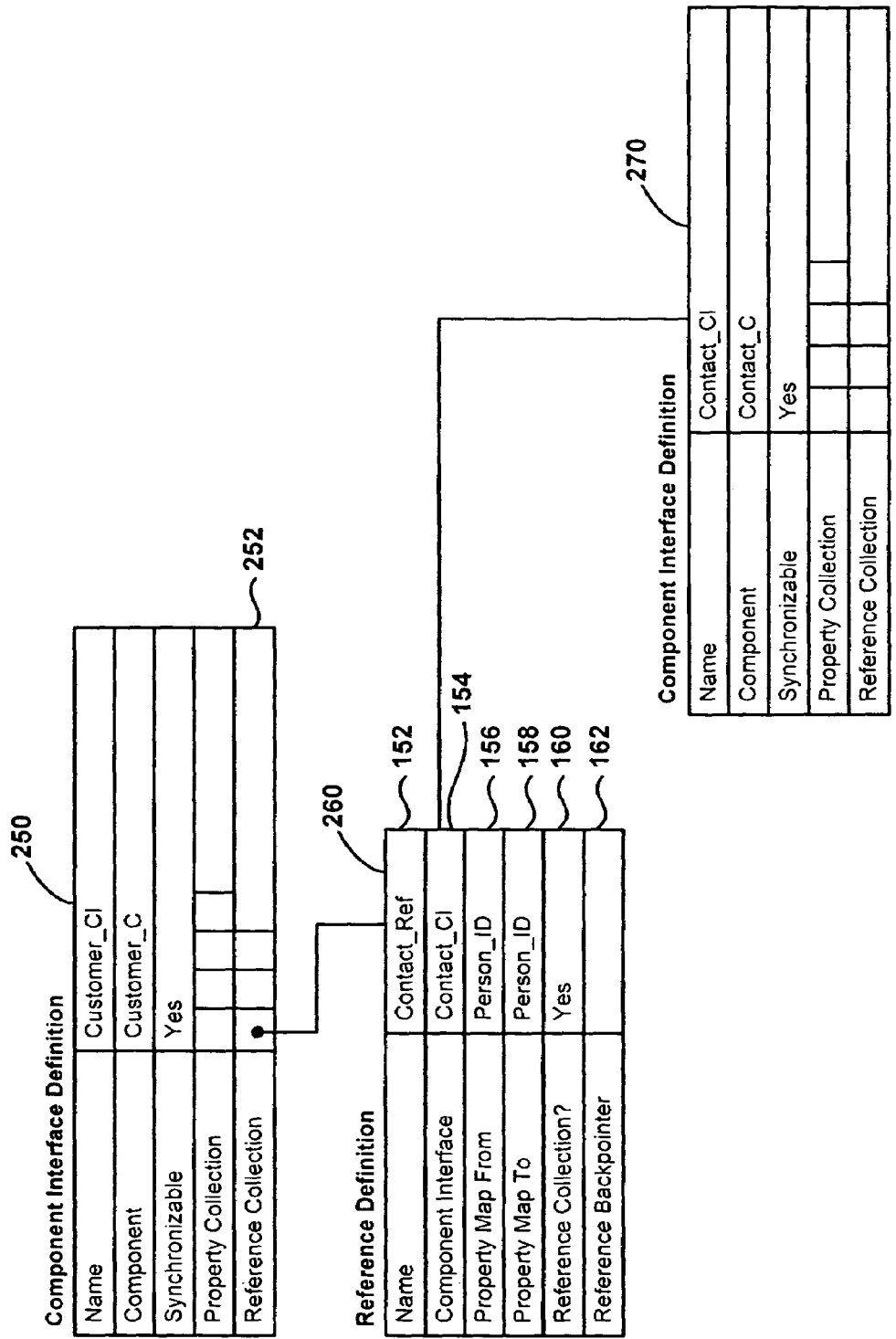
FIG. 14 shows meta-data for a reference definition defining a relationship between two component interfaces according to an embodiment of the invention.

As indicated by FIG. 6, after the relevant objects for a particular component interface 117 on the sync list 152 have been synchronized with the mobile device 104, a referenced component type may be determined. FIG. 14 shows an example of meta-data for determining a referenced component type from a particular component interface 117 on the sync list 152. In the example shown in FIG. 14, a component interface definition 250 is shown for a customer component interface related to a customer component type. Here, component interface definition 250 includes a reference collection 252. The reference collection 252 is a set of reference definitions such as reference definition 260. In the example, reference definition 260 indicates a relationship between component interface definition 250 and another component interface definition 270 for a contact component interface related to a contact component type. It will be appreciated that the sync processor 127 can then located still other referenced component types for possible synchronization from any reference definitions associated with the component interface definition 270.

In the example shown in FIG. 14, if the customer component interface 250 were on the sync list and the relevant objects from customer component interface 250 had been synchronized, the sync processor 127 would next identify contact component interface 270 from reference definition 260 to determine that the contact component type was a referenced component type. Thereafter, the sync processor 127 and the sync server 118 can synchronize referenced objects to the mobile device as shown in FIG. 6. Synchronizing referenced objects to the mobile device 104 proceeds similarly to the synchronization of relevant objects as previously discussed and also includes removing unnecessary objects from the object store 122. Although the invention has been described in terms of a sequence of steps where each step is executed following the completion of the previous step, it will be understood that many of these steps can be performed in parallel. For example, referenced objects can be synchronized while relevant objects are being synchronized.

In the foregoing specification, the invention is described with reference to specific embodiments thereof. It will be recognized by those skilled in the art that while the invention is described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that it can be utilized in any number of environments and applications without departing from the broader spirit and scope thereof. The specification and drawings are, accordingly, to be regarded in an illustrative rather than a restrictive sense.

What is claimed is:

1. A method for synchronization of a mobile device with a central computer system, comprising:
    coupling the mobile device to an application server of the central computer system;
    defining a sync list including one or more candidate object types;
    receiving a selection of a candidate object type in the one or more candidate object type for synchronization, the candidate object type including a set of candidate objects;
    determining one or more relevant objects in the set of candidate objects using relevance rules for the candidate object type;
    synchronizing the one or more relevant objects of the candidate object type to the mobile device;
    determining a referenced object type from the relevant object type using reference rules for the candidate object type, the referenced object type including a set of referenced objects;
    determining one or more relevant referenced objects in the set of referenced objects using the relevance rules, the one or more relevant referenced objects referencing the one or more relevant objects; and
    synchronizing one or more referenced objects of the referenced object type to the mobile device, wherein the one or more relevant objects and one or more relevant referenced objects represent a subset of the set of relevant objects and set of referenced objects, wherein the one or more relevant objects and the one or more referenced objects are automatically determined based on the selection of the candidate object type.

2. The method for synchronization of claim 1 wherein coupling the mobile device to the application server includes
    making the central computer system accessible over a network;
    coupling the mobile device to the network;
    identifying a user of the mobile device to the central computer system; and
    establishing a connection between the mobile device and the application server.

3. The method for synchronization of claim 2 wherein making the central computer system accessible over the network includes configuring a web server to be in communication with the network.

4. The method for synchronization of claim 3 wherein making the central computer system accessible over the network further includes having the web server specify an address by way of a sync gateway servlet.

5. The method for synchronization of claim 4 wherein the address is a URL.

6. The method for synchronization of claim 2 wherein the network is the Internet and coupling the mobile device to the network includes coupling a mobile agent of the mobile device to the Internet.

7. The method for synchronization of claim 2 wherein identifying a user of the mobile device to the central computer system includes having the mobile device transmit identifying indicia to the web server.

8. The method for synchronization of claim 7 wherein the identifying indicia uniquely identify the mobile device and the user.

9. The method for synchronization of claim 7 wherein the identifying indicia include a user ID, a password, and a device type.

10. The method for synchronization of claim 3 wherein establishing the connection between the mobile device and the application server includes establishing a connection between the web server and a sync server of the application server.

11. The method for synchronization of claim 1 wherein defining a sync list includes identifying a component interface associated with the candidate object type.

12. The method for synchronization of claim 11 wherein meta-data associates the component interface with a candidate object type in the one or more candidate object types.

13. The method for synchronization of claim 11 wherein the component interface is derived from an access control list.

14. The method for synchronization of claim 13 wherein the access control list is derived from a role.

15. The method for synchronization of claim 14 wherein the role is derived from a user definition associated with a user ID.

16. The method for synchronization of claim 11 wherein synchronizing the one or more relevant objects to the mobile device includes
selecting the component interface from the sync list;
finding a relevant object in the one or more relevant objects; and
copying the relevant object to the mobile device.

17. The method for synchronization of claim 16 wherein finding the relevant object includes locating a component of a component type associated with the component interface.

18. The method for synchronization of claim 17 wherein locating the component includes applying a rule in the relevance rules.

19. The method for synchronization of claim 18 wherein the rule can be dependent on a user identity, a user role, a device type, or a combination thereof.

20. The method for synchronization of claim 17 wherein the rule is embodied in the component interface.

21. The method for synchronization of claim 16 wherein copying the relevant object to the mobile device includes determining whether the relevant object is already on the mobile device.

22. The method for synchronization of claim 21 wherein the relevant object is copied to the mobile device if the relevant object is determined to not already be on the mobile device.

23. The method for synchronization of claim 21 wherein the relevant object is not copied to the mobile device if an identical copy of the relevant object is determined to already be on the mobile device.

24. The method for synchronization of claim 16 wherein synchronizing the one or more relevant objects to the mobile device further includes removing an unnecessary object from the mobile device.

25. The method for synchronization of claim 11 wherein determining the referenced object type from the relevant object type includes determining a referenced component interface from the relevant component interface.

26. The method for synchronization of claim 25 wherein the referenced component interface is determined from the relevant component interface by a reference definition associated with the relevant component interface.

27. The method for synchronization of claim 26 wherein synchronizing the one or more referenced objects to the mobile device includes finding a referenced object in the one or more referenced objects; and
copying the referenced object to the mobile device.

28. A device for synchronization of a mobile device, the device comprising:
logic configured to couple to the mobile device;
logic configured to define a sync list including one or more candidate object types;
logic configured to receive a selection of a candidate object type in the one or more candidate object types for synchronization, the candidate object type including a set of candidate objects;
logic configured to determine one or more relevant objects in the set of candidate objects using relevance rules for the candidate object type;
logic configured to synchronize the one or more relevant objects of the candidate object type to the mobile device;
logic configured to determine a referenced object type from the relevant object type using reference rules for the candidate object type, the referenced object type including a set of referenced objects;
logic configured to determine one or more relevant referenced objects in the set of referenced objects using the relevance rules, the one or more relevant referenced objects referencing the one or more relevant objects; and
logic configured to synchronize one or more referenced objects of the referenced object type to the mobile device, wherein the one or more relevant objects and one or more relevant referenced objects represent a subset of the set of relevant objects and set of referenced objects, wherein the one or more relevant objects and the one or more referenced objects are automatically determined based on the selection of the candidate object type.

29. A method for synchronization of a mobile device with a computer system, comprising:
coupling the mobile device to a synchronization server of the computer system; receiving a sync list including one or more candidate object types from the synchronization server;
determining, at the mobile device, a candidate object type in the one or more candidate object types for synchronization, the candidate object type including a set of candidate objects;
determining one or more relevant objects in the set of candidate objects using relevance rules for the candidate object type;
requesting the one or more relevant objects of the candidate object type from the synchronization server;
determining a referenced object type from the relevant object type using reference rules for the candidate object type, the referenced object type including a set of referenced objects;
determining one or more relevant referenced objects in the set of referenced objects using the relevance rules, the one or more relevant referenced objects referencing the one or more relevant objects;
requesting the one or more referenced objects of the referenced object type to the mobile device, wherein the one or more relevant objects and one or more relevant referenced objects represent a subset of the set of relevant objects and set of referenced objects, wherein the one or more relevant objects and the one or more referenced objects are automatically determined based on the selection of the candidate object type; and receiving the requested one or more relevant objects and the one or more referenced objects from the synchronization server.

\* \* \* \* \*

UNITED STATES PATENT AND TRADEMARK OFFICE
CERTIFICATE OF CORRECTION

PATENT NO. : 7,076,567 B1
APPLICATION NO. : 10/133124
DATED : July 11, 2006
INVENTOR(S) : Doug Chasman et al.

It is certified that error appears in the above-identified patent and that said Letters Patent is hereby corrected as shown below:

Column 14, line 21, replace "type" with --types--.

Column 16, line 46, insert a paragraph return after "the computer system;".

Signed and Sealed this

Twenty-fourth Day of October, 2006

JON W. DUDAS
*Director of the United States Patent and Trademark Office*